No. 876,047. PATENTED JAN. 7, 1908.
T. R. FELTS.
ANIMAL TRAINER.
APPLICATION FILED JUNE 11, 1907.

Witnesses
S. L. Armstrong
H. F. Totten

Inventor
Thomas Rufus Felts
By Knight Bros
Attorneys

UNITED STATES PATENT OFFICE.

THOMAS RUFUS FELTS, OF SELMA, ALABAMA.

ANIMAL-TRAINER.

No. 876,047.  Specification of Letters Patent.  Patented Jan. 7, 1908.

Application filed June 11, 1907. Serial No. 378,430.

*To all whom it may concern:*

Be it known that I, THOMAS R. FELTS, a citizen of the United States, residing at Selma, in the county of Dallas, State of Alabama, have invented certain new and useful Improvements in Animal-Trainers, of which the following is a specification.

My invention relates to the general class of animal trainers but is more particularly adapted for training the leg action of the horse and consists of certain means whereby all defects in the leg action of the horse may be remedied without injury to the animal.

Figure 1:
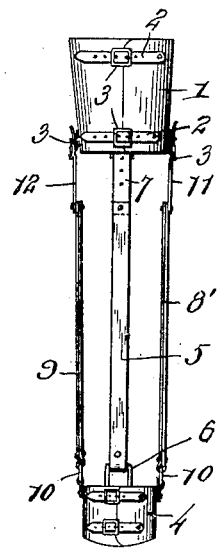
Figure 2:
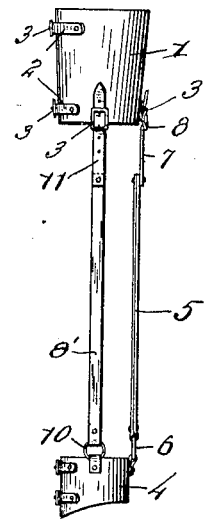
Figure 3:
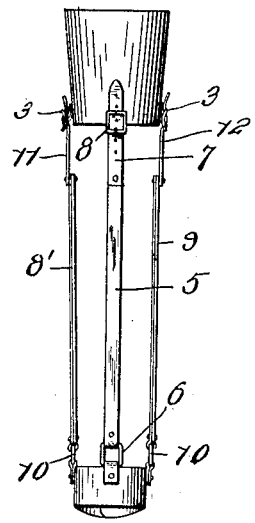

In the drawing:—Figure 1 is a front elevation of a trainer embodying my invention. Fig. 2 is a side elevation of the trainer. Fig. 3 is a rear elevation of the same.

1 represents a band provided with the straps 2 and buckles 3, by means of which it is secured around the front leg of a horse above the knee. 4 is a similar band somewhat narrower provided with similar buckles and straps whereby it is secured to the front leg of a horse below the pastern. As will be seen from the drawing, the buckles and straps upon these two bands are positioned in front of the leg.

5 is a strap, of very heavy elastic, one end of which is secured permanently to the band 4 by means of the loop 6.

7 is a strap secured to the upper end of the elastic strap 5 which is adapted to be secured to the band 1 by means of the buckle 8. This heavy elastic strap is positioned on the bands 1 and 4 so that it will be immediately in the rear of the leg when the bands 1 and 4 are secured in proper positions. The strap 7, by means of a series of holes, is adapted to put more or less tension upon the elastic strap as the strap is lengthened or shortened, thus increasing or diminishing the tension upon the horse's foot.

8' and 9 are elastic straps secured diametrically opposite each other permanently to the band 4 by means of suitable loops or rings 10. To the upper end of the straps 8' and 9 are rigidly secured straps 11 and 12 respectively, provided with a series of holes and adapted to engage the buckles 3 on the band 1.

As stated, the object of this invention is to give proper action in the front legs of the horse and to cure defects in the leg action. If the leg action is straight, the elastic straps 5, 8' and 9 may be tightened by means of the strap 7, 11 and 12 so that any number of pounds or ounces can be drawn as will in the opinion of the user give the necessary knee action. In case the animal has a tendency to throw the front feet inward, greater tension is placed upon the outside elastic strap 8' whereby the foot is drawn outward to one side when lifted from the ground. In the event that the animal has too great an outward throw of the foot, the inside elastic strap 9 is tightened so as to increase the tension, thereby drawing the foot inward when it is lifted from the ground.

From the above it will be seen that I have provided by my invention, an adjustable trainer whereby the gait of the animal in the front legs can be governed at will by regulating the tension through the elastic straps thus increasing or diminishing the tension as the circumstances may require.

It will be noted that the elastic strap 5 is materially heavier than the other elastic straps and naturally will result in giving a greater tension to the foot and lower leg than the other straps and its function is to not only take care of the knee action but to assist the other straps in holding the leg straight.

It is obvious that changes may be made in the details of construction of my invention without departing from the scope thereof, and hence, I do not wish to be limited to said details of construction shown

What is claimed is:—

1. In a trainer for animals, the combination with bands adapted to be secured to the leg of an animal, of means to increase the throw of the foot of an animal toward the rear, and independent means to increase the throw of the foot to one side.

2. In a trainer for animals, the combination with bands adapted to be secured respectively above the knee and below the pastern on the front leg of a horse, of an adjustable elastic member connecting the two bands at the rear, and an adjustable elastic member connecting the bands on each side of the leg.

3. In a trainer for animals, the combination with bands adapted to be secured respectively above the knee and below the pastern on the front leg of a horse, of an elastic member connected at its lower end to the band positioned below the pastern, an inelastic adjusting member rigidly secured to the upper end of the elastic member, means providing an adjustable connection between the inelastic member and the band secured above the knee of the animal, elastic members secured at their lower ends to the band below the pastern and relatively weaker than the first-mentioned elastic member, inelastic adjusting straps rigidly secured to the upper end of the side elastic members and means connected to the band above the knee providing an adjustable connection between said band and said side members and their inelastic straps.

The foregoing specification signed at Selma, Alabama this 26th day of January, 1907.

THOMAS RUFUS FELTS.

In presence of—
L. E. JEFFRIES,
E. W. PETTUS, Jr.